(12) United States Patent
Kleinberg

(10) Patent No.: US 6,460,648 B2
(45) Date of Patent: Oct. 8, 2002

(54) IMPACT SENSOR ASSEMBLY FOR AN AUTOMOTIVE VEHICLE AND A METHOD OF FORMING THE SAME

(75) Inventor: Raymond Kleinberg, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/761,166

(22) Filed: Jan. 8, 2001

(65) Prior Publication Data

US 2002/0088662 A1 Jul. 11, 2002

(51) Int. Cl.[7] .............................................. B60R 21/32
(52) U.S. Cl. ................. 180/282; 180/274; 200/61.45 R
(58) Field of Search .................................. 180/274, 282; 280/734, 730.2, 735; 340/436; 248/548, 550, 309.1; 200/61.45 R

(56) References Cited

U.S. PATENT DOCUMENTS 5,080,188 A * 1/1992 Okuhara et al. ............ 180/282
5,281,780 A * 1/1994 Haland ........................ 180/274
5,311,963 A * 5/1994 Shigeoka et al. ........... 180/274
5,793,005 A * 8/1998 Kato .......................... 180/282
5,934,703 A * 8/1999 Mimura et al. ............. 180/274

FOREIGN PATENT DOCUMENTS

| GB | 2 335 631 A | * | 9/1999 |
| JP | 5-330399 A | * | 12/1993 |
| JP | 6-87403 A | * | 3/1994 |
| JP | 9-123869 A | * | 5/1997 |
| JP | 10-24800 | * | 1/1998 |
| JP | 2000-142283 A | * | 5/2000 |
| JP | 2000-142285 A | * | 5/2000 |
| JP | 2000-142310 A | * | 5/2000 |
| JP | 2000-313305 A | * | 11/2000 |

* cited by examiner

Primary Examiner—Paul N. Dickson
Assistant Examiner—Ruth Ilan
(74) Attorney, Agent, or Firm—Laura C. Hargitt

(57) ABSTRACT

An impact sensor assembly that has particular utility in automotive vehicles is disclosed. The assembly includes an impact sensor and a bracket that is placed operatively adjacent the sensor. The bracket includes a portion extending away from the sensor for extending the sensing area of the sensor.

11 Claims, 2 Drawing Sheets

IMPACT SENSOR ASSEMBLY FOR AN AUTOMOTIVE VEHICLE AND A METHOD OF FORMING THE SAME

TECHNICAL FIELD

The present invention relates to an impact sensor assembly that includes an impact sensor and a bracket operatively adjacent the impact sensor. More particularly, the present invention relates to an impact sensor assembly having an impact sensor and a bracket operatively adjacent the impact sensor wherein the bracket includes a portion extending away from the sensor toward an outer portion of an automotive vehicle.

BACKGROUND OF THE INVENTION

Impact sensors or sensor assemblies are often placed within or upon an automotive vehicle to sense phenomena caused by an impact force on the vehicle structure. Generally impact sensor assemblies send a signal to a controller or other unit based upon the phenomena sensed. Such phenomena sensed by these sensor assemblies include, but are not limited to, acceleration, deceleration, force, velocity, crush or other phenomena. In many cases, these sensor assemblies are mounted adjacent an outer panel or other outer portion of the vehicle for sensing the phenomena caused by an impact force on those panels or portions. Furthermore, these sensor assemblies are often mounted at particular positions adjacent the panels or portions of a vehicle to control the sensitivity of the sensor assembly to impact forces or to maximize the likelihood that the sensor assembly will sense certain impacts.

However, vehicle body designs change over time and such design changes may change the preferred positions within a vehicle to place a sensor assembly. Such design changes of the vehicle and such placement changes of sensor assemblies within the vehicle can make it desirable to change the design of the sensor assemblies so that the sensor assemblies are appropriate for their new location or for the new vehicle design. Changing such sensor assembly designs can be costly. Therefore, it may be desirable to have a sensor assembly design that can be easily adapted for placement in different portions or positions within a vehicle while maintaining or improving the desired sensitivity of the assembly to impacts.

SUMMARY OF THE INVENTION

According to a first aspect of the present invention, there is disclosed an impact sensor assembly for an automotive vehicle. The sensor assembly includes a bracket having a first portion and a second portion wherein the bracket is designed to be disposed inside an outer portion of the automotive vehicle. The sensor assembly also includes a sensor operatively adjacent the first portion of the bracket wherein the second portion of the bracket at least partially extends toward the outer portion of the vehicle.

According to a second aspect of the present invention, there is disclosed a method of forming an impact sensor assembly for an automotive vehicle. The method includes the steps of providing a sensor, and providing a bracket operatively adjacent the sensor such that a portion of the bracket extends away from the sensor toward an outer panel of the automotive vehicle for extending the sensing area of the sensor.

According to a third non-limiting aspect of the present invention, there is disclosed a bracket for supporting an impact sensor within an automotive vehicle. The bracket includes a first panel designed to attach to the impact sensor and a second panel attached to the first panel for receiving and transmitting loads to the sensor wherein the second panel extends away from the first panel and away from the sensor, the second panel further including at least one flange.

These and other objects, aspects, and advantages of the present invention will become apparent upon reading the following detailed description in combination with the accompanying drawings.

DESCRIPTION OF PREFERRED EMBODIMENT

The present invention relates to an impact sensor assembly that has particular application for use in an automotive vehicle. The impact sensor assembly generally includes a sensor operatively adjacent a bracket, and the bracket includes a portion that extends away from the sensor toward an outer panel or other outer portion of a body of the vehicle for fine tuning the sensitivity of the sensor or for adapting the sensor assembly for placement at a particular position within the vehicle. In a non-limiting embodiment, the sensor assembly may be in communication with a controller or other unit and may send signals to the controller or other unit based upon phenomena sensed. Such phenomena may include, but is not limited to, force, acceleration, deceleration, velocity, crush or other phenomena caused by impact of the vehicle with another object. The controller may then signal the activation of another item within the vehicle such as a side impact air bag.

Figure 1:
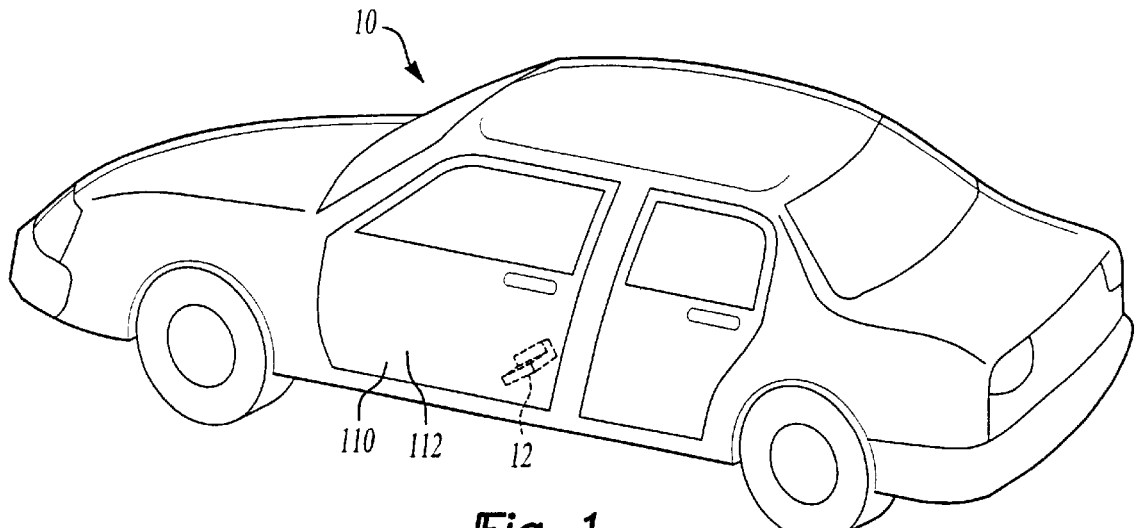
FIG. 1 illustrates a perspective view of an impact sensor assembly installed in an automotive vehicle according to a non-limiting aspect of the present invention.
Figure 2:
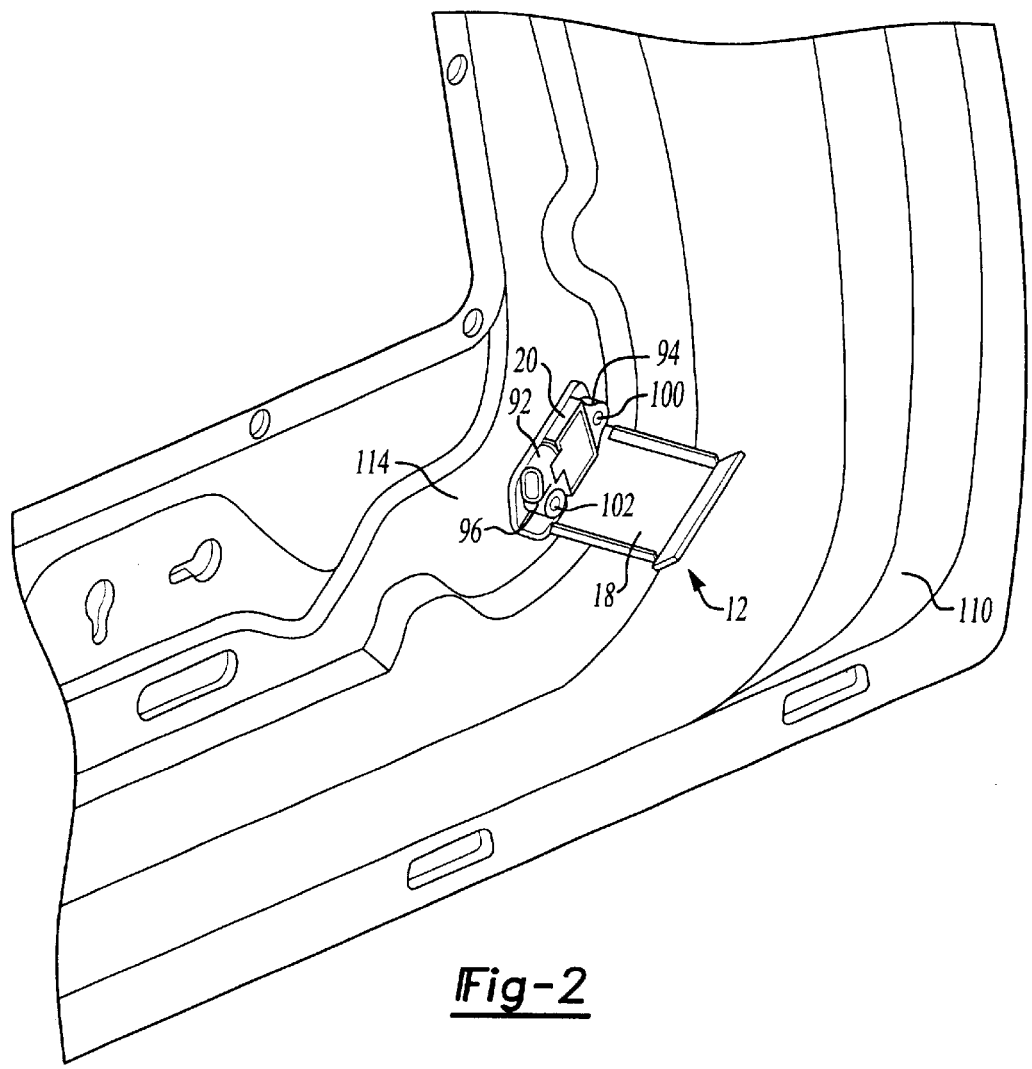
FIG. 2 illustrates a magnified perspective cut away view of the impact sensor assembly of FIG. 1.

Referring now to FIGS. 1 and 2, there is illustrated an automotive vehicle 10 that includes an impact sensor assembly 12 in accordance with the teachings of the present invention. One of skill in the art will appreciate that the impact sensor assembly 12 can be used to sense impacts experienced by an automotive vehicle such as the vehicle 10 shown. However, one of skill in the art will also appreciate that the impact sensor assembly 12 or variations of the assembly 12 can be used in a variety of vehicles or in a variety of applications other than automotive vehicles. For illustrative purposes, however, the impact sensor assembly 12 will be described for use in an automotive vehicle wherein the assembly can be disposed between an inner portion of an automotive vehicle and an outer portion of the vehicle.

An impact sensor assembly according to the present invention generally includes an impact sensor and a bracket. As shown in FIGS. 1 and 2, there is an exemplary bracket 18 and an exemplary sensor 20.

Turning first to a description of the bracket, the bracket of the assembly generally includes at least two portions: a first portion that is placed operatively adjacent the sensor and a second portion for extending away from the sensor and toward an outer panel of an automotive vehicle.

Figure 3:
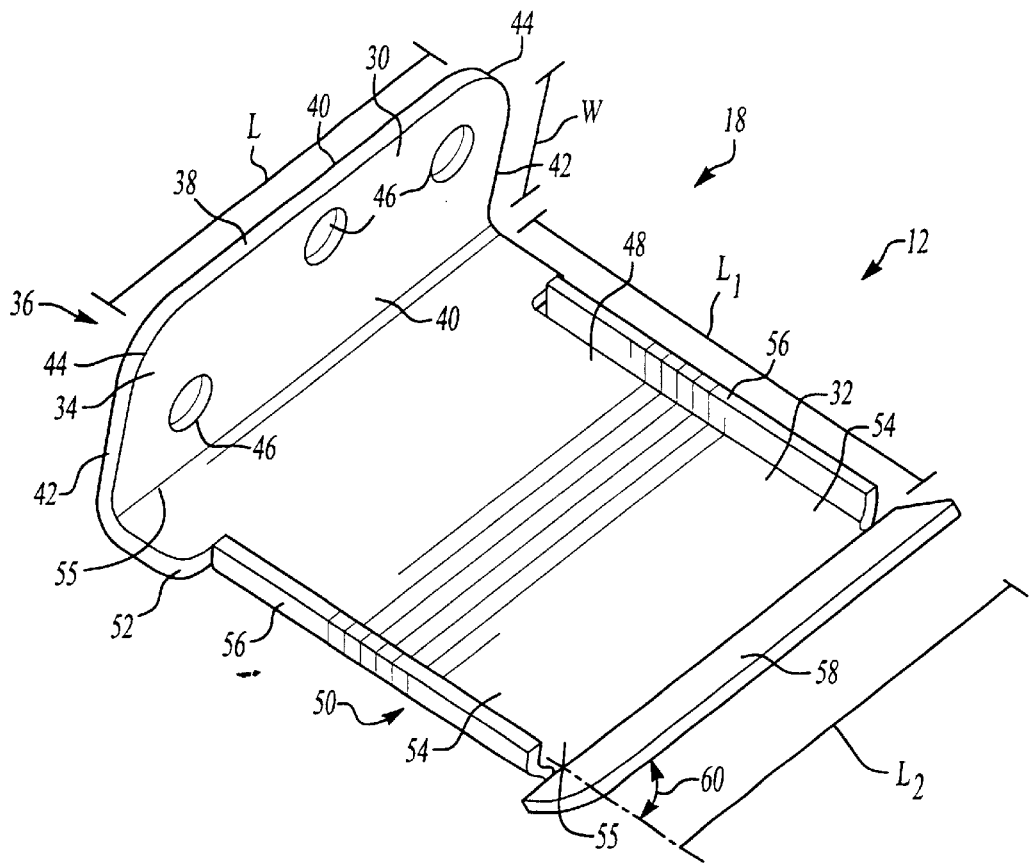
FIG. 3 illustrates a perspective view of one embodiment of a bracket for an impact sensor assembly according to a non-limiting aspect of the present invention.

Referring to FIGS. 2 and 3, there is illustrated the exemplary bracket 18 in accordance with the teachings of a non-limiting aspect of the present invention. The bracket 18 includes a first portion and a second portion. In the embodiment disclosed, the first portion is a first panel 30 with a first surface 34 and a second surface 36 that generally oppose each other and are separated by a thickness 38. The panel 30 is generally rectangular having two sides 40 extending along a length (L) of the panel 30 and two sides 42 extending along a width (W) of the panel 30. One of skill in the art, however, will appreciate that other geometric shapes, including both simple and complex geometric configurations, can be used to form the first portion. A first one of the sides 40 extending along the length (L) of the panel 30 is integrally attached to the second portion 32 of the bracket 18 and a second one of the sides 40 extending along the length (L) of the panel 30 extends between two arcuate portions 44 of the panel 30. As shown, the two arcuate portions 44 reside between and interconnect the sides 42 extending along the width (W) of the panel 30 to the second one of the sides 40 extending along the length (L) of the panel. Additionally, the first panel 30 includes a plurality of through holes 46 extending through the first and second surfaces 34, 36 of the panel 30 and through the thickness 38.

In the embodiment disclosed the second portion of the bracket 18 is also a panel 32 and has a first surface 48 and a second surface 50 that generally oppose each other and are separated by a thickness 52. The panel 32 is generally square or rectangular having a first pair of opposing sides 54 extending along a first length ($L_1$) of the panel 32 and a second pair of opposing sides 55 extending along a second length ($L_2$) of the panel 32. However, one of skill in the art will appreciate that different geometric configurations such as spherical, trapezoidal or other simple or complex geometric shapes can be used to form the second portion. Additionally, the second panel 32 includes a first flange 56 and second flange 56 wherein the first and second flanges 56 extend from the first pair of opposing sides 54 of the panel 32 to which they are attached. The panel 32 also includes a third flange 58 extending from a first one of the second pair of opposing sides 55 of the panel 54 and a second one of the second pair of opposing sides 55 is integrally attached to the first panel 30.

In the embodiment disclosed, the first panel 30 is generally disposed at a right angle with respect to the second panel 32. Furthermore, the first and second flanges 56 are generally rectangular and are also generally disposed at right angles with respect to the second panel 32 such that the first panel 30 and the first and second flanges 56 extend in a substantially similar direction away from the second panel 32. The third flange 58 extends away from the second panel 32 at an angle 60 that is approximately forty-five degrees. As will be further described below, the flanges 56 can assist in stiffening the second portion of the bracket 18 to assist in fine tuning the sensor assembly 12.

In a non-limiting embodiment, the bracket 18 may be formed from a single panel of sheet metal (e.g., steel). The single panel of sheet metal may be cut, bent or otherwise shaped to form the flanges 56, 58, the holes 46, and to dispose the first portion 30 at an angle with respect to the second panel 32. It shall be appreciated, however, by those of skill in the art that a variety of other materials and forming techniques may be used to form the bracket.

Figure 4:
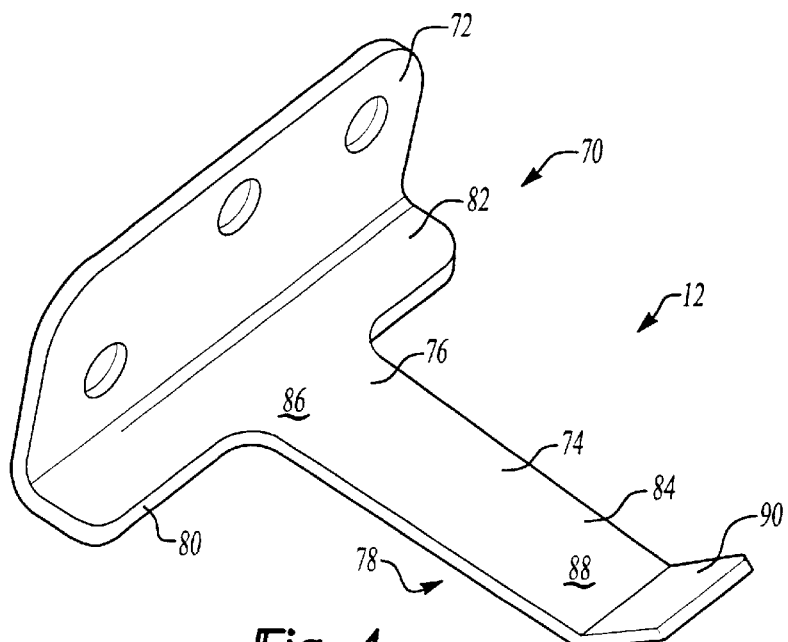
FIG. 4 illustrates a perspective view of another embodiment of a bracket for an impact sensor assembly according to a non-limiting aspect of the present invention.

Referring to FIG. 4, there is illustrated an alternative embodiment of a bracket 70 according to the teachings of a non-limiting aspect of the present invention. The bracket 70 includes a first portion 72 and a second portion 74. The first portion 72 of the bracket 70 in FIG. 4 is substantially identical to the first portion 30 of the bracket 18 in FIG. 3. However, the second portion 74 of the bracket 70 in FIG. 4 has been altered. The second portion 74 of the bracket 70 in FIG. 4 includes a first surface 76 and a second surface 78 separated by a thickness 80. The first and second surfaces 76, 78 define a base portion 82 and an elongated finger 84. The elongated finger 84 extends between a proximate end 86 adjacent or attached to the base portion 82 to a distal end 88 that ends at a flange 90.

It shall be appreciated that the second portions of the brackets disclosed may be used to control where the sensor will sense phenomena such as acceleration and deceleration and may be used to control what proportion of the phenomena the sensor will sense. As will be further described below, phenomena caused by contact with the second portion of the brackets may be transmitted to the first portion of the bracket and, hence, to the sensor. Therefore, by adjusting how far the second portion extends from the sensor, the area in which the sensor will sense phenomena can be controlled, and by adjusting the shape or configuration of the second portion, the proportional amount of such phenomena transmitted may be controlled. Hence, one of ordinary skill in the art will appreciate that the bracket of the present invention may be formed in variety of shapes and configurations similar to the configurations disclosed without departing from the scope of the present invention. However, the embodiments of FIGS. 3 and 4 are particularly advantageous in that tuning is accomplished by changing the angle of the flanges 58, 90 relative to the panel 32, portion 74 respectively thereby adjusting the reach of the brackets. This can be easily accomplished in response to slight modifications in the vehicle's design.

Turning now to a discussion of the sensor of the sensor assembly. In the embodiment disclosed in FIG. 2, the sensor 20 is an acceleration based sensor (i.e., the sensor 20 can sense accelerations or decelerations imposed upon the sensor 20). The sensor 20 includes a generally elongated housing 92 having a length that extends between a first end 94 and a second end 96. A first hole 100 is located adjacent the first end 94 and a second hole 102 is located adjacent the second end 96 and the first and second holes 100, 102 extend through the housing 92 of the sensor 20. A locating pin (not shown) extends away from the sensor 20 and the housing 92 surrounds and/or is part of an accelerometer (not shown) for measuring accelerations or decelerations of the sensor 20 or both.

The person of ordinary skill in the art will recognize that a variety of sensors similar to the sensor 20 illustrated may be used within the scope of the present invention. For example, in alternative embodiments, the sensor 20 may be chosen from a variety of conventional and commercially available sensors, it may be a newly designed sensor or it may be another suitable sensor. In still other alternative embodiments, the sensor 20 may sense force, contact, movement, velocity, crush or other suitable and detectable phenomena.

Assembly

Referring to FIGS. 1 and 2, the assembly or installation of the sensor assembly of the present invention into an automotive vehicle shall now be discussed. In general, the sensor of the sensor assembly is positioned operatively adjacent the bracket of the assembly, and the assembly is positioned between an inner portion and an outer portion of an automotive vehicle. In a non-limiting embodiment, the assembly is positioned such that the second portion of the bracket extends away from the sensor and toward the outer portion of the vehicle. In other non-limiting embodiments, the bracket may be attached to an outer portion of the vehicle and may extend toward and/or away from the sensor without actually contacting the sensor until an impact of the vehicle with another object occurs.

For the purpose of greater detail and without intending to be limited thereby, one exemplary assembly of the sensor assembly 12 into a door 110 of the vehicle 10 in FIGS. 1 and 2 shall be discussed. As further discussed below, the location (i.e., the door 110 of the vehicle) of assembly should not be considered as limiting the present invention.

In FIGS. 1 and 2, the door 110 of the vehicle 10 includes an outer portion 112 and an inner portion 114. In the embodiment shown, the inner portion 114 is a door frame 114 and the outer portion 112 is an outer door panel 112 of the body of the vehicle 10.

To assemble the sensor assembly 12 to the vehicle 10, the sensor 20 is abuttingly placed into contact with the first surface 34 of the first panel 30 of the bracket 18 such that the holes 100, 102 of the sensor 20 align with two of the holes 46 of the first panel 30. The locating pin (not shown) of the sensor 20 should at least partially extend through the remaining hole 46 in the first panel 30 when the holes 100, 102 of the sensor 20 align with holes 46 of the first panel 30 thereby assisting in properly locating or positioning the sensor 20 adjacent the first portion 30 of the bracket 18. Thereafter, the aligned holes 30, 32, 46 of the sensor 20 and the first panel 30 of the bracket 18 are further aligned with holes (not shown) in the door frame 114 and fasteners (not shown) such as screws are used to threadably or otherwise fasten the sensor 20 and the bracket 18 to the door frame 114. Once in place, the second panel 32 of the bracket 18 extends away from the door frame 114 toward the door panel 112.

The person of ordinary skill in the art shall recognize that an impact sensor assembly according to the present invention may be placed adjacent a variety of outer portions of the body of a vehicle and that the body of a vehicle for the present application may include, but is not limited to, panels that make up the front and rear quarter panels, the trunk, the door panels, the roof or the hood, and the body may also include the bumpers or other portions of the vehicle.

Furthermore, the skilled artisan will recognize that automotive vehicles generally include numerous locations where an inner portion of the vehicle such as the vehicle frame, portions of the engine or a frame of other portions of the vehicle are located inside of and adjacent such outer panels of the body of the vehicle and that the sensor assembly of the present invention may be utilized in nearly all of these locations and is not limited to the door of a vehicle.

Operation

Referring again to FIGS. 1 and 2, the manner in which the impact sensor assembly 12 senses impacts shall be discussed.

If an object collides with or otherwise causes an impact on an outer portion such as a panel of the vehicle toward which the second portion of the bracket extends, the object may contact the panel of the vehicle with enough force to deform such outer panel. During or after such contact, the panel may deform such that it contacts and places a force upon the second portion of the bracket thereby moving the bracket and the sensor at least a short distance (e.g., approximately a millimeter) wherein the distance moved or the acceleration, velocity, crush or deceleration of the movement correspond to the impact experienced. The sensor then senses the movement or phenomena caused by the movement of the bracket and may selectively send a signal based upon the phenomena or movement sensed.

In one embodiment, the sensor may compare the phenomena to a predetermined threshold to determine whether the phenomena caused by the impact exceeds the threshold. If the threshold is exceeded, the sensor may send a signal such as a deployment signal to a controller which may command the deployment of a device such as an air bag.

In the exemplary embodiment shown, an object such as another automotive vehicle may collide with the door panel 112 of the vehicle 10 in FIG. 1. The collision could cause the door panel 112 to deform inwardly of the vehicle toward the sensor assembly 12, such that the panel 112 contacts and places a force upon the second panel 32 of the bracket 18 thereby moving the bracket 18 and the sensor 20 at least a short distance (e.g., approximately a millimeter) making a measurable acceleration or deceleration of the sensor 20 wherein the acceleration or deceleration corresponds to the load or force exerted by the impact. The accelerometer within the sensor 20 then measures the acceleration or deceleration of the sensor 20 during the movement and compares the acceleration or deceleration with a predetermined threshold value. If the acceleration or deceleration exceeds that threshold, then the sensor 20 transmits a signal to a controller commanding deployment of a side air bag.

The second portion of the bracket of the present invention allows the sensing zone or sensing area of the sensor to be altered or extended. The distance away from the sensor that any given second portion extends can assist in determining where and when a sensor will sense a given impact. Such distances may range from approximately one centimeter to approximately twenty centimeters. In a preferred embodiment the distance is greater than three centimeters.

Furthermore, the skilled artisan will recognize that the bracket may be used to assist in fine tuning the sensing of the sensor. For example, by changing the shape, size, thickness or other dimension of the second portion of the bracket, an individual can adjust the amount of flex or give that the second portion will experience upon impact of the outer portion of the vehicle with the second portion of the bracket and the flex or give will effect the amount of acceleration, deceleration, force or other phenomena that the bracket will transmit to the sensor. In this manner, the individual can control what the sensor will sense when certain phenomena are experienced by altering the configuration of the bracket. More specifically an individual can control how much acceleration, deceleration or movement a sensor will sense for impacts of varying calibers. For example, and without intending to be limited thereby, the bracket 18 in FIG. 3 includes flanges 56 that can assist in stiffening the second panel 32 thereby allowing the bracket 18 to transmit a larger proportion of any impact exerted upon the second panel 32 to the sensor 20.

Advantageously, the bracket of the present invention is made of a readily formable material such as steel. Therefore, if a change in the bracket is desired, minimal manufacturing adjustments need be made to alter the bracket.

It should be understood that the invention is not limited to the exact embodiment or construction, which has been illustrated and described but that various changes may be made without departing from the spirit and the scope of the invention.

What is claimed is:

1. An impact sensor assembly for an automotive vehicle, the sensor assembly comprising:
   (a) a sensor for sensing an impact and providing a signal in response to the impact; and
   (b) a bracket for mounting the sensor to the automotive vehicle, the bracket including:
      i) a first panel attached to an inner portion of the automotive vehicle and attached to the sensor; and
      ii) a second panel extending away from the first panel toward an outer body panel of the automotive vehicle, the second panel of the bracket extending beyond the sensor toward the outer body panel of the vehicle thereby extending the sensing area of the sensor;
   wherein the impact deforms the outer body panel to initiate contact between the second panel of the bracket and the outer body panel such that the second panel transmits an acceleration or deceleration caused by the contact to the sensor.

2. An impact sensor assembly as in claim 1, wherein the second panel includes a first flange opposing a second flange for stiffening the second panel, the first flange and second flange disposed respectively at a first angle and a second angle relative to the second panel.

3. An impact sensor assembly as in claim 2, wherein the first angle and the second angle are each approximately 90°.

4. An impact sensor as in claim 1 wherein the second panel includes a flange extending from the second panel, the flange disposed at an angle with respect to the second panel, the angle at least partially determining reach of the bracket.

5. An impact sensor assembly as in claim 4, wherein the angle is approximately 45°.

6. An impact sensor assembly as in claim 1, wherein the sensor includes an accelerometer.

7. An impact sensor assembly as in claim 1, wherein the second panel of the bracket extends away from the sensor a distance greater than one centimeter.

8. An impact sensor assembly for an automotive vehicle, the sensor assembly configured for sensing an impact, the sensor assembly comprising:
   (a) a bracket formed of sheet metal and having:
      i) a first generally rectangular panel attached to a door frame of a door of an automotive vehicle; and
      ii) a second generally rectangular panel attached to the first rectangular panel at a first side of the second panel, the second panel extending away from the first panel toward a door panel of the door of the automotive vehicle, the second panel disposed at about a 90° angle relative to the first panel, the second panel including a first flange opposing a second flange for stiffening the second panel, the first and second flanges disposed respectively at a first angle and a second angle relative to the second panel, the second panel also including a third flange extending from a second side of the second panel opposite the first side of the second panel, the third flange disposed at a third angle with respect to the second panel, the third angle at least partially determining reach of the bracket; and
   (b) a sensor mounted upon the first panel of the bracket, the sensor including an accelerometer, the second panel of the bracket extending beyond the sensor toward the door panel of the vehicle thereby extending the sensing area of the sensor;
   wherein the second panel of the bracket only contacts the door panel if the impact deforms the door panel toward the second panel of the bracket such that the second panel can transmit an acceleration or deceleration caused by the door panel contacting the second panel to the sensor.

9. An impact sensor assembly as in claim 8, wherein the first angle and the second angle are each approximately 90°.

10. An impact sensor assembly as in claim 9, wherein the third angle is approximately 45°.

11. An impact sensor assembly as in claim 10, wherein the second panel of the bracket extends away from the sensor a distance greater than one centimeter.

* * * * *